United States Patent
Kraska et al.

(10) Patent No.: US 7,326,149 B2
(45) Date of Patent: Feb. 5, 2008

(54) CONVERTERLESS TRANSMISSION SHIFT CONTROL SYSTEM

(75) Inventors: Marvin Kraska, Dearborn, MI (US); Walt Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 10/904,352

(22) Filed: Nov. 5, 2004

(65) Prior Publication Data

US 2006/0100060 A1    May 11, 2006

(51) Int. Cl.
*F16H 61/26* (2006.01)

(52) U.S. Cl. .............. 477/135; 477/140; 477/154

(58) Field of Classification Search ........ 477/135, 477/140, 154
See application file for complete search history.

(56) References Cited

U.S. PATENT DOCUMENTS

| | | | |
|---|---|---|---|
| 4,527,678 A * | 7/1985 | Pierce et al. ............ 192/3.58 |
| 4,653,351 A * | 3/1987 | Downs et al. ............ 477/148 |
| 4,790,418 A | 12/1988 | Brown et al. |
| 4,989,477 A | 2/1991 | Hunter et al. |
| 5,058,460 A | 10/1991 | Hibner et al. |
| 5,580,332 A | 12/1996 | Mitchell et al. |
| 5,609,067 A | 3/1997 | Mitchell et al. |
| 5,749,061 A | 5/1998 | Kono et al. |
| 5,927,415 A | 7/1999 | Ibaraki et al. |
| 5,964,675 A | 10/1999 | Shimada et al. |
| 6,176,808 B1 | 1/2001 | Brown et al. |
| 6,217,479 B1 | 4/2001 | Brown et al. |
| 6,299,565 B1 | 10/2001 | Jain et al. |
| 6,370,463 B1 | 4/2002 | Fujii et al. |
| 6,463,821 B1 | 10/2002 | Reed, Jr. et al. |
| 6,490,511 B1 | 12/2002 | Raftari et al. |
| 6,577,939 B1 | 6/2003 | Keyse et al. |
| 6,585,066 B1 | 7/2003 | Koneda et al. |
| 6,742,639 B2 * | 6/2004 | Aikawa et al. ............ 192/3.61 |
| 2003/0232696 A1 | 12/2003 | Shibagaki |
| 2005/0103544 A1 * | 5/2005 | Takami et al. ............ 180/65.2 |

* cited by examiner

*Primary Examiner*—Ha D. Ho
(74) *Attorney, Agent, or Firm*—David B. Kelley; Brooks Kushman P.C.

(57) ABSTRACT

A converterless, multiple-ratio transmission and shift control method wherein smoothness of power-on upshifts and downshifts and power-off upshifts and downshifts is achieved by closed loop control of slip speed and friction element actuating pressure for an oncoming friction element, the data used during the closed loop control including speed sensor information for multiple friction elements during upshift and downshifts events.

12 Claims, 6 Drawing Sheets

| GEAR | RC | FC | DC | L,R | 2/4 | RATIO |
|------|----|----|----|-----|-----|-------|
| 1st  |    | X  |    | X   |     | 2.889 |
| 2nd  |    | X  |    |     | X   | 1.571 |
| 3rd  |    | X  | X  |     |     | 1.000 |
| 4th  |    |    | X  |     | X   | 0.695 |
| REV  | X  |    |    | X   |     | 2.310 |

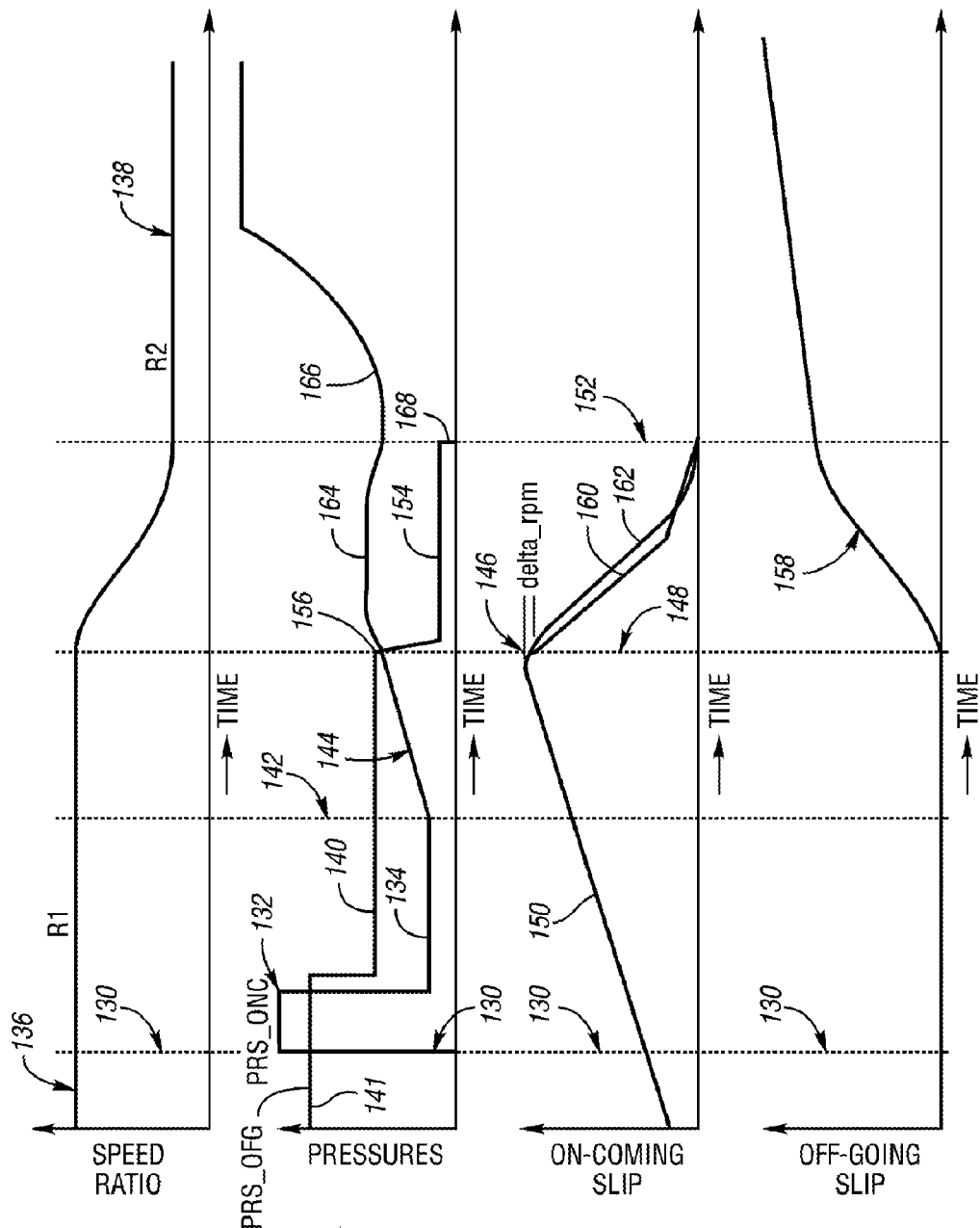

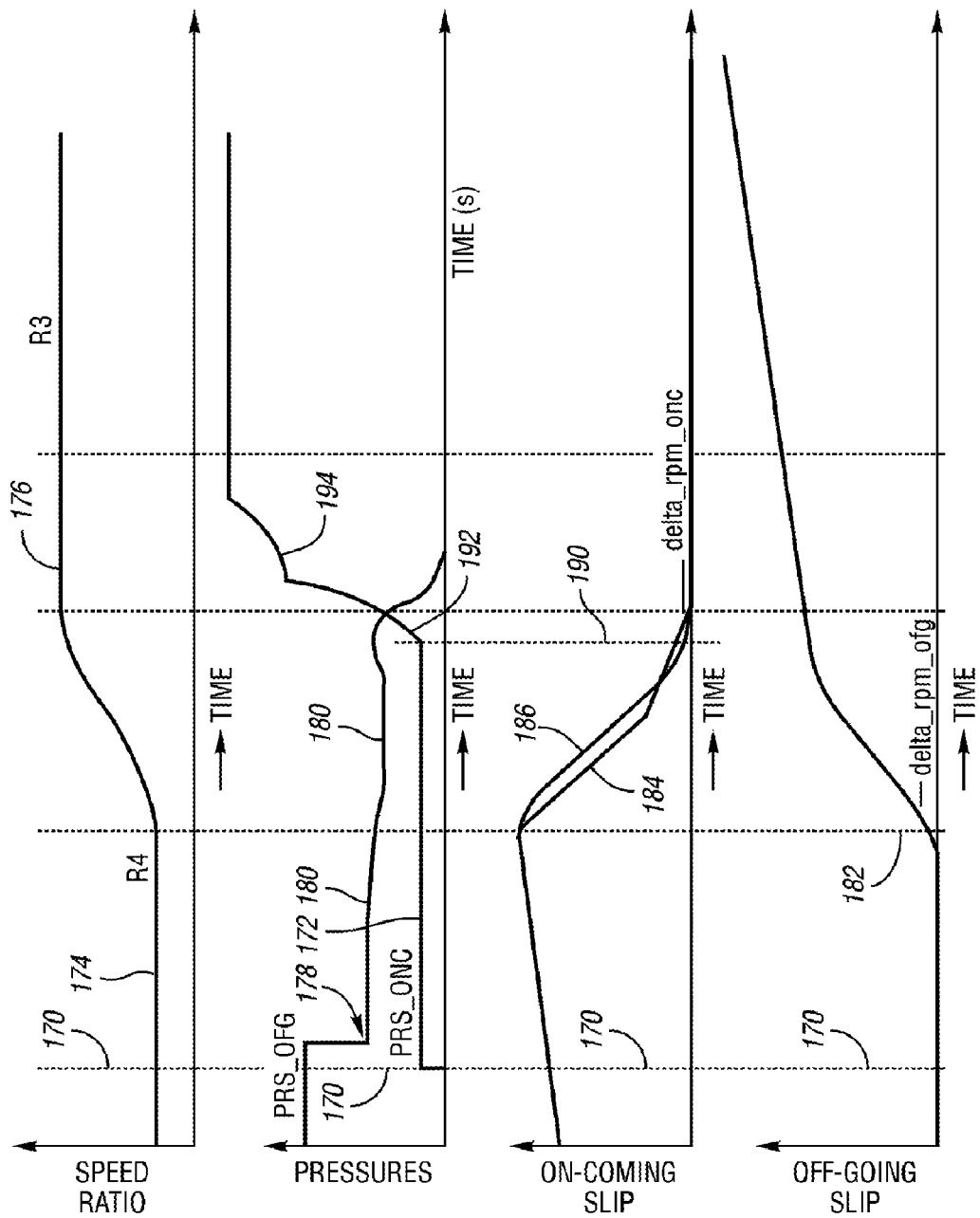

US 7,326,149 B2

CONVERTERLESS TRANSMISSION SHIFT CONTROL SYSTEM

BACKGROUND OF THE INVENTION

1. Field of the Invention

The invention relates to automotive vehicle powertrains, including a hybrid electric vehicle powertrain, with an engine connected driveably to torque input elements of multi-ratio transmission gearing without a hydrokinetic torque converter.

2. Background Art

In a conventional multiple-ratio power transmission mechanism for automotive vehicle powertrains, a hydrokinetic torque converter typically is disposed between an internal combustion engine and torque input elements of multiple-ratio gearing, which establishes multiple torque flow paths to vehicle traction wheels. The torque converter provides a torsional dampening effect that modifies dynamic disturbances during ratio shifting. It also effects smooth and improved launch performance of the vehicle from a standing start.

These advantages of a torque converter are partially offset by an inherent torque converter inefficiency, which results in a power loss manifested by a high operating temperature of the hydrokinetic torque converter fluid. This necessitates the use of an oil cooler. Further, the torque converter has a substantial rotary mass, including the mass of its hydraulic fluid, which adds to the gross weight of the transmission assembly. It also requires significant packaging space in the powertrain assembly.

Attempts have been made to eliminate the torque converter from the transmission to avoid inherent hydrokinetic power losses in the converter that reduce overall transmission efficiency. A control system for a converterless transmission of this type is disclosed in U.S. Pat. No. 6,299,565, which describes a strategy for obtaining maximum smoothness during a vehicle launch, as well as transient damping by a slipping wet clutch. The clutch is allowed to slip during engagement and disengagement of transmission ratio controlling friction elements.

A converterless transmission control system is disclosed also in U.S. Pat. No. 6,217,479, which discloses a strategy for slipping a friction element of a clutch and brake system for multiple-ratio gearing to achieve torsional isolation that normally would be provided by a hydrokinetic torque converter.

U.S. Pat. Nos. 6,176,808 and 6,585,066 disclose a converterless transmission in a hybrid electric vehicle powertrain wherein a high voltage induction motor is situated between an engine and multiple-ratio gearing. The motor is used to provide added vehicle launch performance and to reduce undesirable torsional vibrations during vehicle launch and during transmission ratio shifting. The rotor of the motor provides a rotary mass that achieves a flywheel effect analogous to the flywheel effect provided by a rotary torque converter in a conventional hydrokinetic torque converter transmission. U.S. Pat. No. 6,585,066 further discloses a slipping wet clutch in the power flow path between the engine and torque input elements of the gearing. The wet clutch complements the function of a damper assembly in transmission power flow paths, such as the power flow paths described in the '808 patent, by attenuating peak torque fluctuations during vehicle launch and during ratio shifts.

In a powertrain of the kind disclosed in the prior art references mentioned above, which are owned by the assignee of the present invention, a shift of the automatic transmission is characterized by two distinct shift phases, commonly referred to as a torque phase and an inertia phase. A power-on upshift, for example, experiences a torque phase when the capacity of the oncoming friction element is increased to control the shift. The output torque is changed to the upshifted torque while the speeds remain at the downshifted values. The torque phase is followed by an inertia phase in which the speeds of the engine and the transmission components are decreased to the upshifted values.

Normally, the torque phase is controlled using an open loop control system that is either event-based or time-based. Speed sensors within the transmission can detect the start of the inertia phase. When a speed ratio change is detected, the shift control system typically begins closed loop control of the oncoming friction element.

In a conventional transmission, only an input speed sensor and an output speed sensor are required since it is necessary only to obtain repetitive values of the speed ratio during the inertia phase to control shift events. The speed sensors determine the overall transmission ratio. Since the only event that is being controlled at any given instant is the shift event, the overall ratio is an indicator of the progress of the shift event. Thus, the speed ratio, or its derivative, is used as a control variable for closed loop control of the inertia phase and as a trigger for initiating other control events during the shift interval.

In a converterless multiple-ratio transmission of the kind previously discussed, such as the pre-transmission hybrid transmissions of the '066 patent and the '808 patent, it may be necessary, while a shift event is taking place, to control dynamic events other than the shift event. One example of a dynamic event that would be controlled during a shift event is disclosed in co-pending U.S. patent application Ser. No. 10/838,489 filed May 4, 2004, now U.S. Pat. No. 6,991,585, entitled "Torsional Isolation of a Converterless Automatic Transmission Through Slip Control of Friction Clutch." That co-pending patent application is assigned to the assignee of this invention.

In a powertrain with a torsional isolation control strategy, for example, multiple clutches can be slipping so that the overall transmission ratio may not be indicative of the status of the shift event. Using transmission ratio percent shift complete as a control parameter, therefore, can cause errors by the shift controller, which can adversely affect shift quality. It is desirable, therefore, to use a strategy for controlling shift events that will accommodate accurate control of at least one additional simultaneous event.

SUMMARY OF THE INVENTION

The invention comprises a converterless transmission and control strategy that makes it possible to control simultaneously at least two events during a ratio shift interval to achieve maximum smoothness and to attenuate torsional vibrations during both vehicle start up and ratio shifting. The invention uses multiple speed sensors, in addition to the usual input and output speed sensors, so that the slip speed of several friction elements in the powertrain can be determined at each instant during the shift event under all circumstances. By knowing the slip speed for each friction element, the exact status of a shift event can be separated from the status of other control events that occur simultaneously during the ratio shift interval.

Unlike prior art shift control strategies that require an overall ratio as a control parameter during a shift event, the strategy of the present invention avoids errors created when multiple clutches are slipping by using the added speed information from the multiple speed sensors. The slip speed of the oncoming friction element is used as a control parameter rather than overall speed ratio.

The slip speed of the oncoming friction element is captured at the beginning of the shift. It is stored in random access memory of an electronic transmission controller and accessed by a central processor unit (CPU) in the controller to compute instantaneous states of a shift during a shift event. The control strategy will cause the slip speed of an oncoming friction element during a ratio change to progress to a zero value at the end of a shift event. Based on this information, the transmission controller determines slip speed triggers and a closed loop shift profile at the beginning of every shift event. The shift then proceeds in a manner similar to other closed loop shifts found in prior art control systems, but it is independent of other simultaneous transmission control events.

At the beginning of a ratio shift, the actuating pressure for an oncoming friction element is increased during a torque phase of the shift to effect rapid filling of a pressure actuator for the oncoming friction element. The slip speed of an actuator for an off-going friction element is detected at the beginning of an inertia phase of the shift. Slip speed of the oncoming friction element is controlled during the inertia phase of an upshift using closed loop control triggered by detection of a slip speed change for the oncoming friction element. Slip speed of the oncoming friction element is controlled during the inertia phase of a downshift using closed loop control triggered by detection of off-going friction element slip speed.

At the end of closed loop control, the pressure on the actuator for the oncoming friction element is increased as slip speed of the oncoming friction element becomes approximately zero.

BRIEF DESCRIPTION OF THE DRAWINGS

FIG. 1a is a schematic line diagram of the transmission shown in FIG. 1;

FIG. 1b is a chart showing the clutch and brake engagement and release pattern for the transmission illustrated in FIGS. 1 and 1a;

FIG. 2a is a time plot of speed ratio during a power-on upshift event;

FIG. 2b is a time plot of pressure on the off-going friction element during a power-on upshift;

FIG. 2c is a time plot of a slip speed of an oncoming friction element during a power-on upshift;

FIG. 2d is a time plot of the slip speed of an off-going friction element during a power-on upshift;

FIG. 3a is a time plot of the speed ratio during a power-on downshift;

FIG. 3b is a time plot of the pressures on the off-going friction element during a power-on downshift;

FIG. 3c is a time plot of the slip speed for the oncoming friction element during a power-on downshift;

FIG. 3d is a time plot of the slip speed of an off-going friction element;

DETAILED DESCRIPTION OF AN EMBODIMENT OF THE INVENTION

Figure 1:
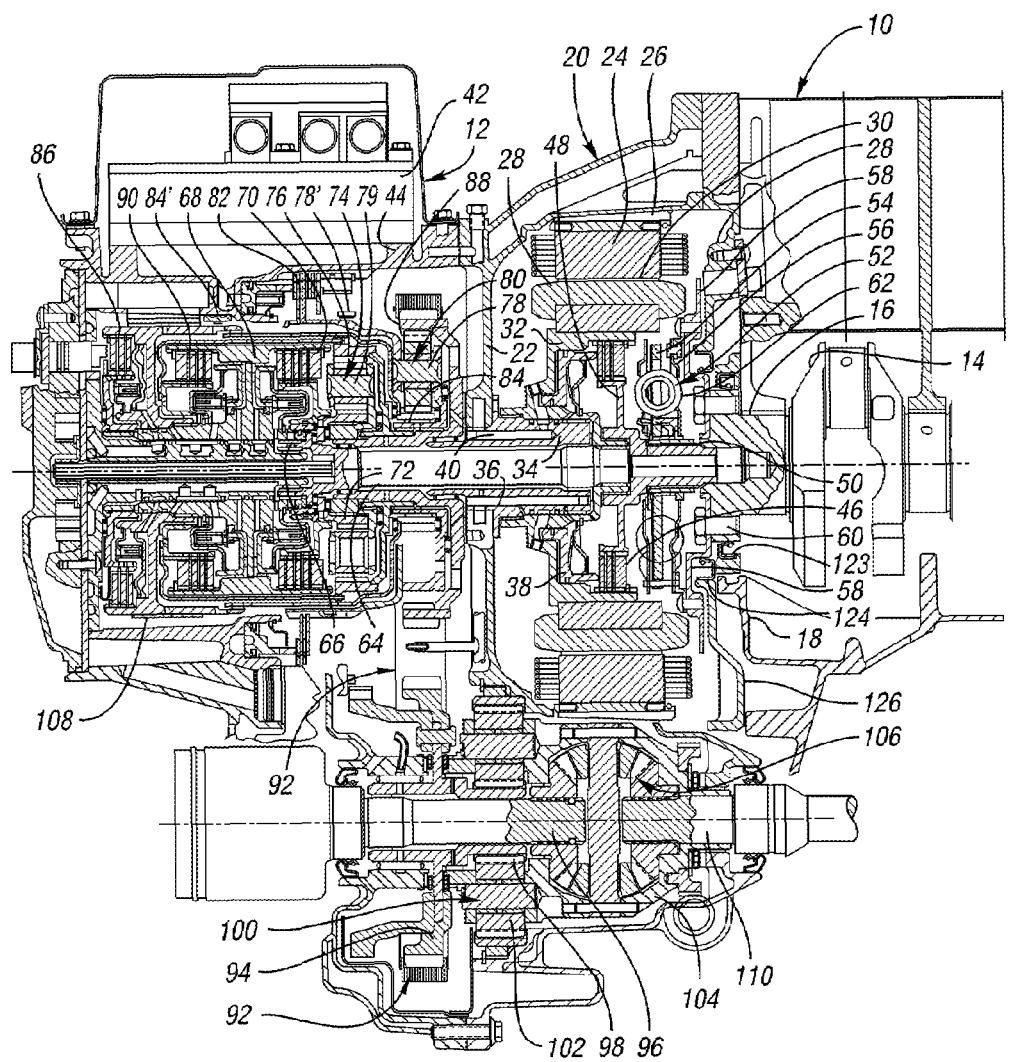
FIG. 1 is a cross-sectional view of a multiple-ratio transmission in a hybrid electric vehicle powertrain capable of embodying the control strategy of the present invention.

A converterless transmission capable of incorporating the strategy and control method of the invention is shown in FIG. 1. In FIG. 1, reference numeral 10 designates schematically an internal combustion engine for an automotive vehicle. Numeral 12 designates generally a multiple-ratio automatic transmission.

The engine 10 includes a crankshaft 14 journalled at 16 in end wall 18 of the engine housing. An intermediate housing 20 is located between the end wall 18 of the engine 10 and wall 22 for the transmission 12.

The intermediate housing encloses a stator 24 of an electric motor. The stator and the stator windings are secured to an interior machined surface 26 of the housing 20. A rotor assembly 28 is situated within the stator and separated from the stator by an air gap designated by numeral 30.

A slipping wet clutch cylinder 32 is secured to the rotor assembly 28. A bearing support shaft 34 rotatably supports the clutch cylinder 32 and is secured by bolts 36, or by other suitable fastening techniques, to the transmission wall 22.

An annular piston 38 is situated within the clutch cylinder 32 and cooperates with the cylinder to define a pressure chamber in communication with fluid pressure passage 40 in the support shaft 34. Passage 40 communicates with passage structure extending to a control valve body, shown generally at 42, which is secured to the upper side of transmission housing 44.

A slipping wet clutch disc assembly 46 has clutch plates secured to the cylinder 32. Internally splined clutch discs are carried by clutch element 48, which in turn is connected, preferably by drive splines, to the hub 50 of a spring damper assembly 52. A damper drive plate 54 is connected directly to the hub 50. Damper housing 56 is connected directly to crankshaft drive plate 58. The hub of drive plate 58 is secured directly, preferably by bolts 60, to the end of crankshaft 14.

Damper springs 62 are situated between the damper drive plate 54 and the damper housing 56. They are arranged in a circular fashion about the axis of the hub 50, thereby providing a resilient connection between the crankshaft and the clutch element 48 in known fashion.

The input shaft for the transmission is shown at 64. Although the transmission illustrated in FIG. 1 can be used in the powertrain of the invention, other gearing arrangements also can be used to provide forward driving torque flow paths and a reverse ratio. The gearing arrangement for the embodiment of FIG. 1 is similar to the gearing arrangement illustrated in U.S. Pat. No. 4,938,097 (S. L. Pierce), which is assigned to the assignee of the present invention.

Input shaft 64 is connected through a drive spline 66 to clutch cylinder 68 for forward drive friction clutch 70. When clutch 70 is engaged, a driving connection is established between shaft 64 and sun gear 72 of a first planetary gear unit 74. A ring gear 76 is connected driveably to carrier 78 of gear unit 80. Carrier 78 is adapted to be braked by selectively engageable low-and-reverse brake 82.

A sun gear 84 is connected driveably to the transmission input shaft 64 through a reverse clutch 86. The ring gear 88 of the gear unit 80 is driveably connected to the carrier 79 for the gear unit 74.

A direct clutch assembly 90 connects the torque input shaft 64 with the clutch cylinder 68. Clutch cylinder 68 also is connected to the sun gear 72 through the clutch 70, as mentioned earlier. Clutch 90 also connects the shaft 64 to the ring gear 76.

The ring gear 88 of gear unit 80 defines a sprocket for a chain drive, indicated generally at 92. The driven sprocket of the chain drive, shown at 94, is rotatably mounted in the transmission housing on the axis of output shaft 96. It is connected driveably to a sun gear 98 of final drive gearset 100. The ring gear 102 of the final drive gearset 100 is connected directly to the transmission housing.

The carrier of the gearset 100 is connected to differential carrier 104 of a differential gear unit 106. Differential pinions are carried by the carrier 104. They mesh driveably with side gears carried by torque output shaft 96 and a companion output shaft 110. Each output shaft is connected to vehicle traction wheels through a universal joint assembly and axle half-shafts, not shown.

A friction brake band 108 surrounds a brake drum that forms a part of the reverse clutch 86. The brake drum is connected driveably to sun gear 84 of gear unit 80.

A sun gear speed sensor 84' is disposed in close proximity to the brake drum for reverse clutch 86. The brake drum is surrounded by brake band 108, which is engaged during second and fourth ratio to anchor sun gear 84. The speed of sun gear 84 is equal to the speed of the brake drum to which it is directly connected.

The speed sensor 84' may be a proximity-type inductance sensor that develops a voltage pulse signal as a trigger element carried by the adjacent brake drum passes a magnetic flux field of the sensor. The voltage pulses created by the sensor for each revolution of sun gear 84 are sensed by a transmission controller. Each pulse time interval is compared by the controller to the number of clock ticks generated by the controller during the pulse time interval. The number of clock ticks within successive voltage pulses is an indicator of sun gear speed.

A carrier speed sensor 78' is disposed in close proximity to a rotary member of reverse brake 82, which is connected directly to carrier 78. Speed sensor 78' functions in a manner similar to speed sensor 84'. It provides an instantaneous value for the speed of carrier 78 in each control loop of the transmission controller during a transmission ratio shift interval. Together with the usual input and output speed sensors, the speed sensors 84' and 78' provide the speed information needed by the controller to compute slip speeds of an oncoming friction element and an off-going friction element during power-on upshifts and downshifts and power-off upshifts and downshifts.

For a complete description of the gearing and the clutches and brakes of the transmission 12, reference may be made to the previously mentioned Patent U.S. Pat. No. 4,938,097. That description is incorporated in this disclosure by reference.

Figures 1A, 1B:
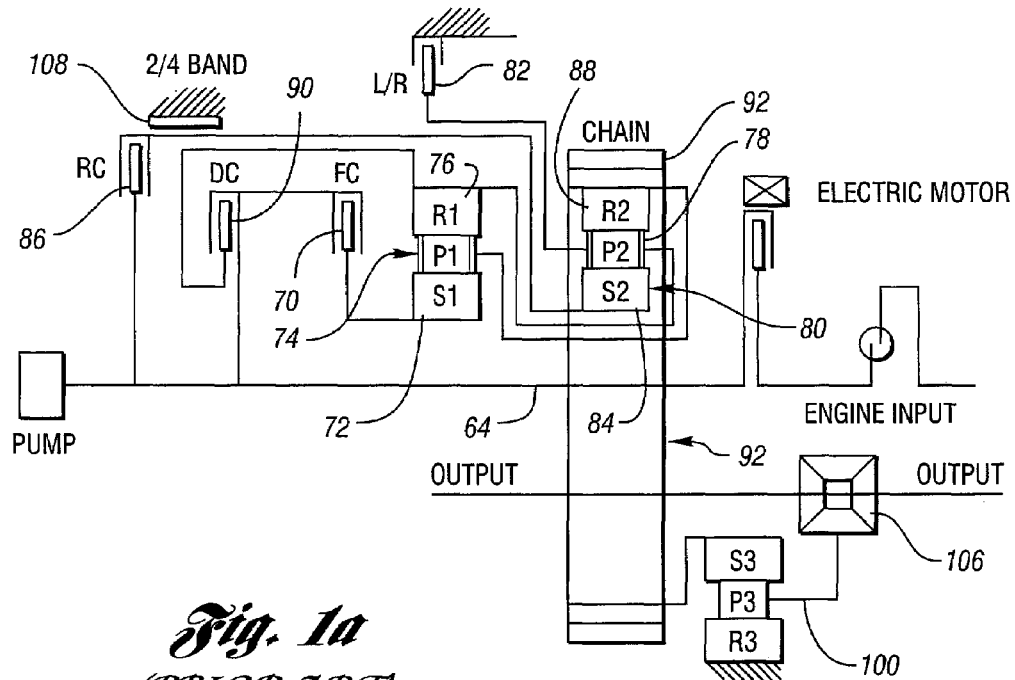

FIG. 1b shows a clutch and brake engagement and release sequence to establish four forward-driving ratios and a single reverse ratio. The clutches and brakes are identified in FIG. 1b by the symbols RC, FC, DC, L/R and 2/4, which indicate, respectively, the reverse clutch 86, the forward clutch 70, the direct clutch 90, the low-and-reverse brake 82 and the brake band 108. The symbols R, S and P (with appropriate subscripts) identify the ring gears, the sun gears and the planetary pinion carriers, respectively.

To establish the first gear ratio in the forward-drive range, the forward clutch FC and the low-and-reverse brake L/R are engaged. The forward clutch remains applied for operation in each of the first three forward-driving ratios.

A ratio change to the second forward-driving ratio is obtained by releasing low-and-reverse brake L/R and by applying brake band 2/4. An upshift to the third ratio is obtained by releasing brake band 2/4 and applying clutch DC. Fourth ratio, which is the top forward-drive ratio, is obtained by releasing the forward clutch FC and applying reaction brake 2/4.

Reverse drive is obtained by simultaneously applying reverse clutch RC and low-and-reverse brake L/R.

The invention comprises a control method and strategy for achieving high quality, power-on upshifts and power-on downshifts as well as power-off upshifts and downshifts. A description of the strategy for power-on upshifts will be described with reference to FIGS. 2a, 2b, 2c, and 2d. A description of the strategy for power-on downshifts will refer to FIGS. 3a, 3b, 3c, and 3d. Power-off upshifts and power-off downshifts have characteristics that are similar in many respects to power-on upshifts and downshifts, as will be explained subsequently.

FIGS. 2a-2d show time plots of the relationship of speed ratio, slip speed, and friction element pressure for both an oncoming friction element and an off-going friction element as the speed ratio changes from a first ratio to a second ratio. The controller commands a power-on upshift at 130 in FIGS. 2a-2d. At that instant, the pressure of the oncoming friction element is raised to a high level, as shown at 132, to speed the filling of the oncoming friction element actuator with pressurized fluid. The oncoming friction element pressure then is reduced to approximately its stroke pressure, as shown at 134 in FIG. 2b. The initial ratio prior to the command at 130 is ratio R1 at 136. In FIG. 2a, the ratio at the completion of the shift is ratio R2, a higher speed ratio, as shown at 138 in FIG. 2a.

As the actuator for the oncoming friction element is filling, the stroke of the actuator is completed without causing any significant torque capacity increase in the friction element. Concurrently, the off-going friction element pressure command is reduced, as shown at 140, to a level that is lower than the initial off-going friction element pressure command at 141. The pressure at 140 will hold the input torque at that instant in the shift interval after the stroke of the oncoming friction element is complete at time 142 in FIG. 2b.

The oncoming friction element pressure then increases or ramps up, as shown at 144. When the pressure on the oncoming friction element is sufficient to start the shift, the capacity of the oncoming friction element will be capable of accommodating input torque plus inertia torque. At that instant, the oncoming friction element slip speed will begin to decrease, as shown at 146, the amount of decrease being identified as delta_rpm at FIG. 2b. This occurs at time 148, as seen in FIG. 2b. Prior to time 148, the oncoming slip speed increases, as shown by the ramp in FIG. 2c at 150.

The value delta_rpm can be used to trigger transmission closed loop control during the inertia phase of the shift, which occurs between time 148 and time 152, seen in FIG. 2b. The oncoming slip speed change at 146 indicates the true state of the oncoming friction element. This could not be detectable if overall transmission ratio, as in the case of conventional control systems, were to be used while other friction elements are being controlled simultaneously with the shift event, as explained previously.

When the oncoming clutch slip speed decreases between time 148 and time 152, the pressure on the off-going friction element actuator is reduced, as shown at 154 in FIG. 2*b*. The value to which it is reduced may be the same as its stroke pressure at 134 following a triggering of the reduction, as shown by the trigger value 156 in FIG. 2*b*. This reduction in the pressure of the off-going friction element releases the off-going friction element, which is manifested by an increasing of off-going friction element slip speed 158, seen in FIG. 2*d*. Since the off-going slip speed directly reflects the state of the off-going friction element, it is possible, using that variable, to reduce the off-going friction element capacity prior to the torque transfer to the minimum capacity required. This is done by adapting the off-going friction element pressure command or by direct control of the slip speed of the off-going friction element to a non-zero value.

Closed loop control of the oncoming friction element slip speed is performed by establishing a target slip speed trajectory, as shown at 160 in FIG. 2*c*, and by comparing it with a measured oncoming slip speed seen in FIG. 2*c* at 162. During each control loop of the controller, the instantaneous error between the commanded oncoming friction element slip speed at 160 and the measured oncoming friction element slip speed at 162 is used to control the oncoming friction element pressure, seen in FIG. 2*b* at 164. This will bring the oncoming friction element slip speed to zero in a fixed time, which is the time value 152 in FIG. 2*c*. The target end point for the oncoming friction element slip speed typically is always zero.

During an early part of the inertia phase, beginning at time 148, the commanded slip speed is varied in value with a first slope. Later in the inertia phase, the slope decreases relative to the first slope. This is done to improve end-of-shift transients as the oncoming friction element stops slipping. The point at which the slope of the commanded slip speed changes is one of the several trigger points that the controller can establish based upon the speed information obtained from the independent speed sensors 84' and 78' seen in FIG. 1.

After the speed change is completed, the oncoming friction element capacity is increased, as shown at 166, in order to have sufficient capacity to hold the combustion torque of the engine. Simultaneously, the pressure for the off-going friction element is reduced to zero as shown at 168 in FIG. 2*b*.

The characteristics of a power-on downshift are shown in FIGS. 3*a*-3*d*. When the driver commands a downshift at time 170 in FIGS. 3*a*-3*d*, the pressure of the oncoming friction element is set at approximately the stroke value 172, seen in FIG. 3*b*. The ratio change that is commanded by the driver is illustrated in FIG. 3*a*, the higher speed ratio R4 being shown at 174 and the lower speed ratio R3 being shown at 176. In a four-speed automatic transmission of the type shown in FIG. 1, this would indicate a 4-3 downshift.

When the oncoming friction element is being stroked with a stroke pressure 172, the oncoming friction element has little or no capacity. The pressure of the off-going friction element is reduced as shown at 178. After a time delay following a command for a pressure reduction, the pressure of the off-going friction element begins to decrease, as shown at 180. This causes the off-going friction element to start slipping, as shown at time 182 in FIG. 3*d*. The change in the off-going friction element slip, beginning at time 182 in FIG. 3*d*, is indicated in FIG. 3*d* as the value delta_rpm_ofg. This variable triggers the start of closed loop control of the oncoming friction element slip speed shown at 184 in FIG. 3*c*.

The value of the slip speed at 184 is compared to a measured oncoming friction element slip speed shown at 186 in FIG. 3*c*. A dynamically compensated error between the slip speeds at 184 and the slip speeds at 186 for any given control loop of the controller is used to control the off-going friction element pressure at 188 in FIG. 3*b*. This causes the oncoming friction element slip speed to be brought to zero in a fixed time. In this way, the oncoming friction element slip speed is used to control the off-going friction element pressure.

A value of the oncoming friction element slip speed equal to zero represents a synchronous speed in ratio R3 at 176. Values of oncoming slip speed less than zero (e.g., the value at time 190 in FIG. 3*c*) represent an over-shoot of synchronous speed. When the oncoming slip speed becomes less than some value (i.e., delta_rpm_onc), the torque transfer may be completed by increasing the oncoming friction element pressure, as shown at 192.

After the oncoming friction element slip speed reaches zero, the oncoming friction element pressure command continues to increase, as shown at 194, to a value that will hold the current input torque in the new ratio 176.

Power-off upshifts are performed in a manner similar to a power-on upshift described with reference to FIGS. 2*a*-2*d*. Slip speed of the oncoming friction element during a power-off upshift is used to directly sense the capacity of the oncoming friction element and to trigger closed loop control. This is similar to the triggering of closed loop control during a power-on upshift, where the oncoming friction element slip is used to trigger closed loop control at time 148 in FIG. 2*d*.

During a power-off upshift, the trajectory of the oncoming friction element slip speed is always driven to zero to complete the shift. Likewise, power-off downshifts are performed in a manner similar to power-on downshifts. Thus, the off-going friction element slip speed is used to directly sense the start of oncoming clutch capacity, and oncoming friction element slip is controlled using closed loop control characteristics until zero slip speed is reached, thereby achieving a synchronous speed. Unlike a power-on downshift, oncoming friction element slip speed is used during power-off downshifts to trigger the closed loop control.

Figure 4:
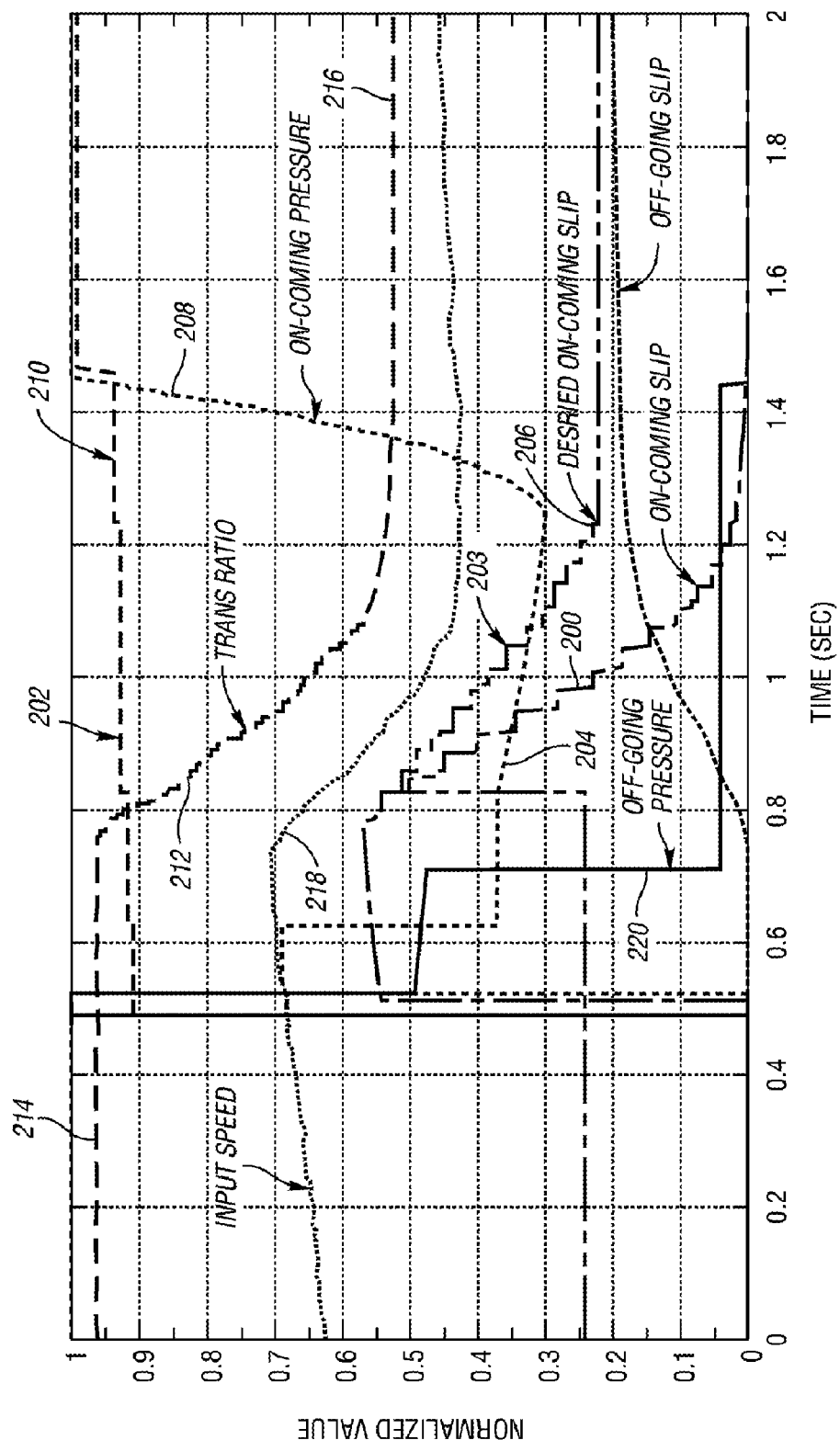
FIG. 4 is a composite time plot for a power-on upshift showing the pressure on the off-going friction element, the slip speed of the oncoming friction element, the slip speed of the off-going friction element, the desired oncoming slip command, the oncoming pressure, the input speed, and the transmission ratio.
Figure 5:
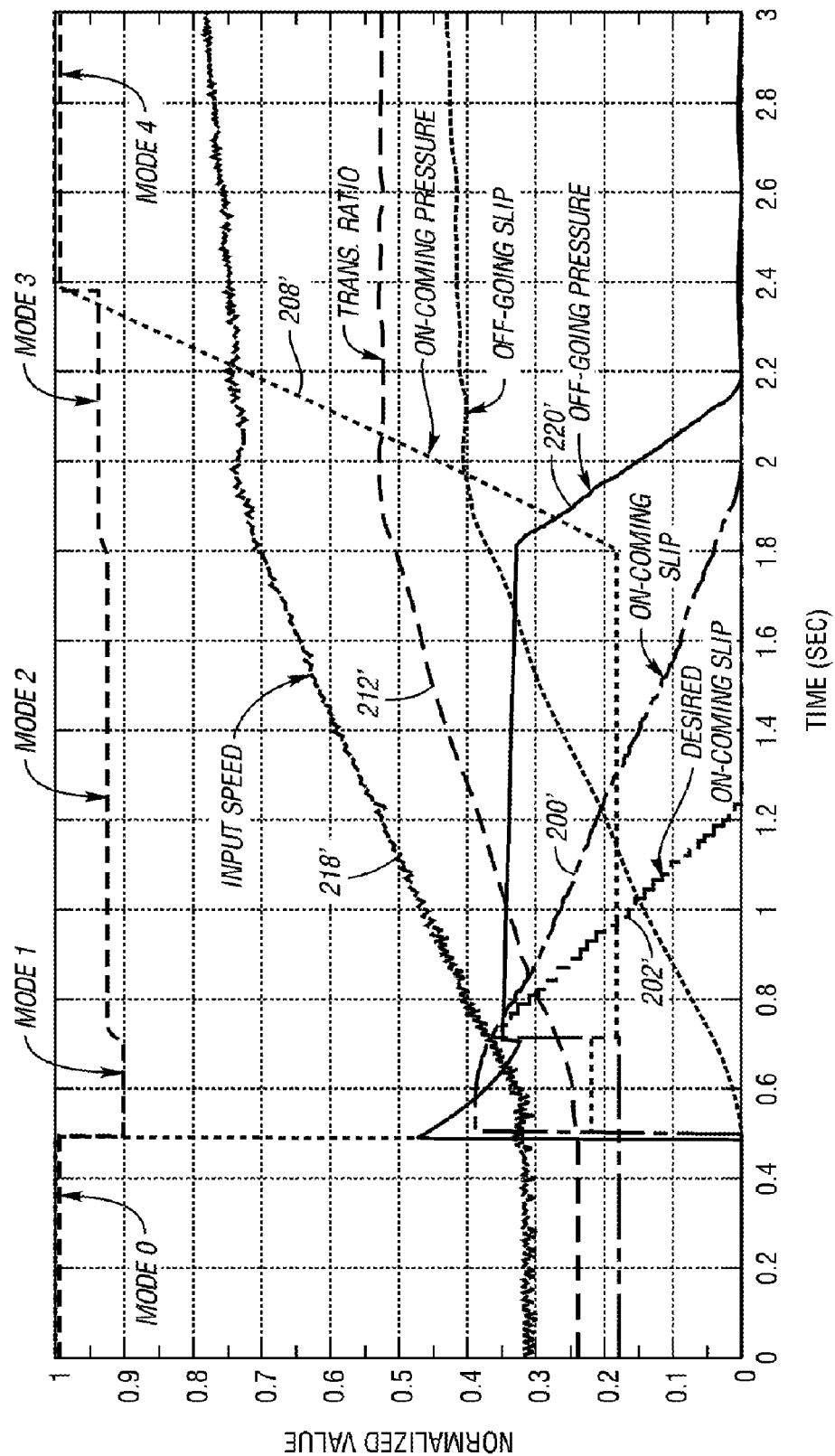
FIG. 5 is a composite time plot for a power-on downshift showing the desired or commanded oncoming slip speed, the actual oncoming slip speed, the off-going friction element pressure, the off-going slip speed, the oncoming friction element pressure, the transmission ratio, and the input speed.

FIGS. 4 and 5 are time plots of shift characteristics during an actual test of a test vehicle with a powertrain incorporating the invention. Data for a power-on upshift is plotted in FIG. 4, and data for a power-on downshift is plotted in FIG. 5. In FIG. 4, the closed loop control of the oncoming friction element slip is shown at 200. The inertia phase at the beginning of the closed loop control of the oncoming friction element slip is shown in FIG. 4 at mode plot 202, which begins at a time of approximately 0.82 seconds after the start of the upshift.

A desired slip trajectory is determined by the processor, as shown by the plot at 203 in FIG. 4. In the case of FIG. 4 where the actual slip speed is decreasing faster than the desired or commanded oncoming friction element slip speed, the pressure on the oncoming friction element can be decreased, as shown at 204 in FIG. 4, in order to reduce the rate of change of the oncoming friction element slip speed.

When the oncoming friction element slip speed is near zero, as shown at 206, the end of the shift is triggered, which brings the oncoming friction element pressure up to the maximum value, as shown at 208, the end of the shift being designated as an end mode plot 210.

The transmission ratio changes during closed loop control, as shown at 212. The initial ratio at the beginning of the shift is shown at 214 and the upshifted ratio is shown at 216. The plot for the input speed during the ratio change is shown at 218.

During a power-on downshift, as shown in FIG. 5, the same variables corresponding to the variables indicated in FIG. 4 are used. They have been designated in FIG. 5, however, by numerals with prime notations corresponding to the numerals used in the description of FIG. 4.

Although an embodiment of the invention has been described, it will be apparent to persons skilled in the art that modifications may be made without departing from the scope of the invention. All such modifications and equivalents thereof are intended to be covered by the following claims.

What is claimed is:

1. A control method for controlling speed ratio shifts in a multiple-ratio converterless transmission for an automotive vehicle powertrain wherein an internal combustion engine is connected directly to torque input elements of the transmission, the transmission having multiple pressure-actuated friction elements, a speed ratio change in the transmission being effected by engaging a pressure actuator for an oncoming friction element and releasing a pressure actuator for an off-going friction element, the method comprising the steps of:

increasing actuating pressure for the oncoming friction element during a torque phase of a power-on upshift;

detecting slip speed of an actuator for the oncoming friction element at the beginning of an inertia phase of the power-on upshift;

controlling slip speed of the oncoming friction element using closed loop control triggered by detection of slip speed of the actuator for the oncoming friction element; and increasing pressure of the actuator for the oncoming friction element at the end of the closed loop control as slip of the oncoming friction element becomes approximately zero.

2. The method set forth in claim 1 wherein the pressure on the actuator for the oncoming friction element is boosted to achieve fast-filling of the actuator for the oncoming friction element.

3. The method set forth in claim 2 wherein the pressure for the actuator for the oncoming friction element, following fast-filling, is reduced to a lower stroke value until stroking of the actuator for the oncoming friction element is complete; and reducing pressure for the actuator for the off-going friction element to a value that is sufficient to hold current input torque prior to the inertia phase.

4. The method set forth in claim 3 wherein the pressure for the off-going friction element is decreased to approximately its stroking pressure thus releasing the actuator for the off-going friction element.

5. The method set forth in claim 4 wherein the pressure for the actuator for the oncoming friction element is increased following the inertia phase to a value sufficient to accommodate current engine combustion torque.

6. The method set forth in claim 5 wherein the step of controlling slip speed of the oncoming friction element comprises commanding an oncoming slip speed during a first part of the inertia phase that decreases in value at a first rate; and commanding an oncoming slip speed during a second part of the inertia phase that decreases in value at a second rate that is less than the first rate whereby the commanded oncoming slip speed at each instant throughout the inertia phase reduces oncoming friction element capacity and improves end-of-shift transients as the oncoming friction element stops slipping.

7. A control method for controlling speed ratio shifts in a multiple-ratio converterless transmission for an automotive vehicle powertrain wherein an internal combustion engine is connected directly to torque input elements of the transmission, the transmission having multiple pressure-actuated friction elements, a speed ratio change in the transmission being effected by engaging a pressure actuator for an oncoming friction element and releasing a pressure actuator for an off-going friction element, the method comprising the steps of:

controlling power-on downshifts by detecting slip speed of the off-going friction element;

controlling slip speed of the oncoming friction element during an inertia phase, the inertia phase being triggered by detection of slip speed of the off-going friction element; and increasing pressure on the actuator for the oncoming friction element upon completion of the inertia phase.

8. The method set forth in claim 7 wherein the pressure on the off-going friction element is decreased to approximately zero at the end of the inertia phase as the pressure on the actuator for the oncoming friction element is increased to effect maximum capacity of the oncoming friction element at an end of the downshift.

9. A control method for controlling speed ratio shifts in a multiple-ratio converterless transmission for an automotive vehicle powertrain wherein an internal combustion engine is connected directly to torque input elements of the transmission, the transmission having multiple pressure-actuated friction elements, a speed ratio change in the transmission being effected by engaging a pressure actuator for an oncoming friction element and releasing a pressure actuator for an off-going friction element, the method comprising the steps of:

controlling power-on downshifts by detecting slip speed of the off-going friction element;

controlling slip speed of the oncoming friction element during an inertia phase, the inertia phase being triggered by detection of slip speed of the off-wing friction element; and increasing pressure on the actuator for the oncoming friction element upon completion of the inertia phase;

wherein the pressure on the actuator for the oncoming friction element is reduced to a low value prior to the inertia phase;

the slip speed of the off-going friction element being increased using closed loop control of the pressure on the actuator for the off-going friction element during the inertia phase.

10. A control method for controlling speed ratio shifts in a multiple-ratio converterless transmission for an automotive vehicle powertrain wherein an internal combustion engine is connected directly to torque input elements of the transmission, the transmission having multiple pressure-actuated friction elements, a speed ratio change in the transmission being effected by engaging a pressure actuator for an oncoming friction element and releasing a pressure actuator for an off-going friction element, the method comprising the steps of:

controlling power-on downshifts by detecting slip speed of the off-going friction element;

controlling slip speed of the oncoming friction element during an inertia phase, the inertia phase being triggered by detection of slip speed of the off-going friction element; and increasing pressure on the actuator for the oncoming friction element upon completion of the inertia phase;

wherein the step of controlling slip speed of the oncoming friction element comprises commanding an oncoming friction element slip speed during a first part of the inertia phase that decreases in value at a first rate; and commanding an oncoming friction element slip speed during a second part of the inertia phase that decreases in value at a second rate that is less than the first rate whereby the commanded oncoming friction element slip speed at each instant throughout the inertia phase reduces oncoming friction element capacity to smooth end-of-shift shock.

11. A control method for controlling speed ratio shifts in a multiple-ratio converterless transmission for an automotive vehicle powertrain wherein an internal combustion engine is connected directly to torque input elements of the transmission, the transmission having multiple pressure-actuated friction elements, a speed ratio change in the transmission being effected by engaging a pressure actuator for an oncoming friction element and releasing a pressure actuator for an off-going friction element, the method comprising the steps of:

controlling power-off upshifts by measuring slip speed of the oncoming friction element to directly sense torque capacity of the oncoming friction element; and controlling oncoming friction element capacity with closed loop control of pressure on the actuator for the oncoming friction element during a power-off upshift.

12. A control method for controlling speed ratio shifts in a multiple-ratio converterless transmission for an automotive vehicle powertrain wherein an internal combustion engine is connected directly to torque input elements of the transmission, the transmission having multiple pressure-actuated friction elements, a speed ratio change in the transmission being effected by engaging a pressure actuator for an oncoming friction element and releasing a pressure actuator for an off-going friction element, the method comprising the steps of:

controlling a power-off downshift by measuring slip speed of the off-going friction element thereby sensing loss of capacity of the off-going friction element;

determining off-going friction element slip speed to detect loss of capacity of the actuator for the off-going friction element; and controlling slip speed of the oncoming friction element during closed loop control of pressure of the actuator for the oncoming friction element.

* * * * *